United States Patent [19]

Moriguchi et al.

[11] Patent Number: 4,485,626

[45] Date of Patent: Dec. 4, 1984

[54] APPARATUS FOR CONTROLLING THE IGNITION TIMING OF AN INTERNAL COMBUSTION ENGINE HAVING A TURBOCHARGER

[75] Inventors: Koichi Moriguchi, Nagoya; Kenzi Iwamoto, Nishio; Hisasi Kawai, Toyohashi; Nobutaka Mizuno; Yasuhiro Ikuta, both of Okazaki, all of Japan

[73] Assignees: Nippon Soken, Inc., Nishio; Toyota Jidosha Kogyo Kabushiki Kaisha, Toyota, both of Japan

[21] Appl. No.: 372,378

[22] Filed: Apr. 27, 1982

[30] Foreign Application Priority Data

Apr. 28, 1981 [JP] Japan .................................. 56-64944

[51] Int. Cl.³ ....................... F02B 37/12; F02D 37/02
[52] U.S. Cl. ........................................ 60/602; 123/425
[58] Field of Search ................. 60/600, 601, 602, 603, 60/605, 611; 123/425, 564

[56] References Cited

U.S. PATENT DOCUMENTS

| 2,670,724 | 3/1954 | Reggio | 123/425 X |
| 4,322,948 | 4/1982 | Emmenthal et al. | 60/602 |
| 4,372,119 | 2/1983 | Gillbrand et al. | 60/600 |

FOREIGN PATENT DOCUMENTS 2095747  10/1982  United Kingdom ................. 60/602

OTHER PUBLICATIONS

SAE Paper No. 780413, Buick's Turbocharged V-6 Power train for 1978, Wallace, Feb. 1978.

Primary Examiner—Michael Koczo
Attorney, Agent, or Firm—Cushman, Darby & Cushman

[57] ABSTRACT

An ignition timing control apparatus for an internal combustion engine having a supercharger in which a feedback control of decreasing the supercharged pressure is done in order to obviate knocking, wherein when a detection is made of a knocking with a detection of decrease in the controlled supercharged pressure under the condition of a constant throttle opening-degree, the ignition timing just at the detection of knocking is held for the control of ignition timing.

4 Claims, 6 Drawing Figures

APPARATUS FOR CONTROLLING THE IGNITION TIMING OF AN INTERNAL COMBUSTION ENGINE HAVING A TURBOCHARGER

BACKGROUND OF THE INVENTION

This invention relates to ignition timing control of an engine in which a knocking state of the engine is detected and a supercharged pressure is feedback-controlled, amd more particularly to an apparatus for controlling the ignition timing to avoid the occurrence of knocking by decreasing the supercharged pressure and holding an intake air pressure indicating signal at just before the occurrence of knocking in order to compute the subsequent ignition timing in accordance with the held signal.

In an internal combustion engine having a supercharger, knocking may easily happen as the supercharged pressure is increased. Therefore, an apparatus for detecting knocking and obviating it is desirable. In currently known apparatuses for this, either the ignition timing is delayed or the supercharged pressure is decreased. Although the former method has a danger of causing such problems as a temperature rise of the exhausted gas and deterioration of the fuel combustion rate, the latter method has such merits as causing a decrease in the temperature of the exhausted gas and causing no degrading in the combustion rate.

Typical signals which represent the operation state of the engine for controlling the ignition timing are those of engine speed (revolution number of engine) and the intake air pressure. If knocking is to be obviated by delaying the ignition timing, a basic ignition timing shuld be set substantially in a trace knock region by referring to the engine speed and intake air pressure. In order to obviate knocking, the actual ignition timing is further delayed from the basic ignition timing. Like this the parameters of engine speed and intake air pressure used for the determination of the basic ignition timing are not changed with the obviation of knocking. On the other hand, if the knocking is to be obviated by decreasing the supercharged pressure, the intake air pressure for determining the basic ignition timing varies. Thus, if a controller is constituted in such a manner that the ignition timing be uniquely determined by the engine speed and the intake air pressure, it will meet following troubles. Namely, on the assumption that the ignition timing is set in a trace knock region, when the supercharged pressure or the intake air pressure is decreased, it may happen with a large probability that the ignition timing advances to a new trace back region corresponding to the decreased intake air pressure. This would cause further knocking and hence the intake air pressure must be again decreased. With repetition of such a cycle, it would become impossible to supply any supercharged pressure to the engine. On the other hand, if the ignition timing is set with a too large margin against knocking, the apparatus for avoiding knocking itself would lose its meaning.

SUMMARY OF THE INVENTION

According to this invention, it is discriminated whether a decrease caused in the intake air pressure is due to the obviation of knocking or not. If it is the case, the ignition timing is held at a value in the occurrence time of knocking to ensure complete obviation of knocking. For a variation of the intake air pressure due to other causes, the ignition timing controller is made to respond either to advance or to delay the timing. In this way, the invention is aimed at the optimum control of ignition timing of an internal combustion engine having a supercharger.

DESCRIPTION OF THE PREFERRED EMBODIMENTS

Figure 1:
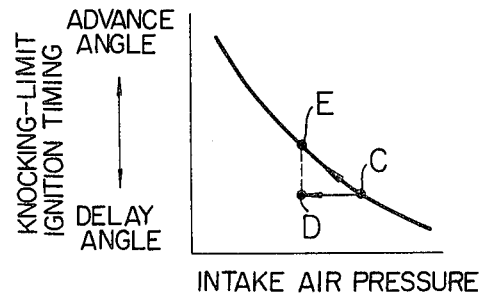
FIG. 1 is a characteristic diagram showing the relation between the supercharged pressure of an internal combustion engine having a supercharger and a knocking-limit ignition timing.

FIG. 1 is a characteristic diagram showing the relation between the intake air pressure and the knocking-limit indicating ignition timing under the condition that the engine speed of the internal combustion engine having a supercharger is kept constant. The knocking-limit ignition timing advances (from a point C to a point E) with a decrease in the intake air pressure (from the point C to a point E).

This invention, utilizing the above-mentioned relation, enables the operation of an optimum ignition timing for a case where the knocking is to be obviated by decreasing the intake air pressure. Further explanation of this invention will be made hereinafter with reference to FIGS. 2 through 5.

Figure 2:
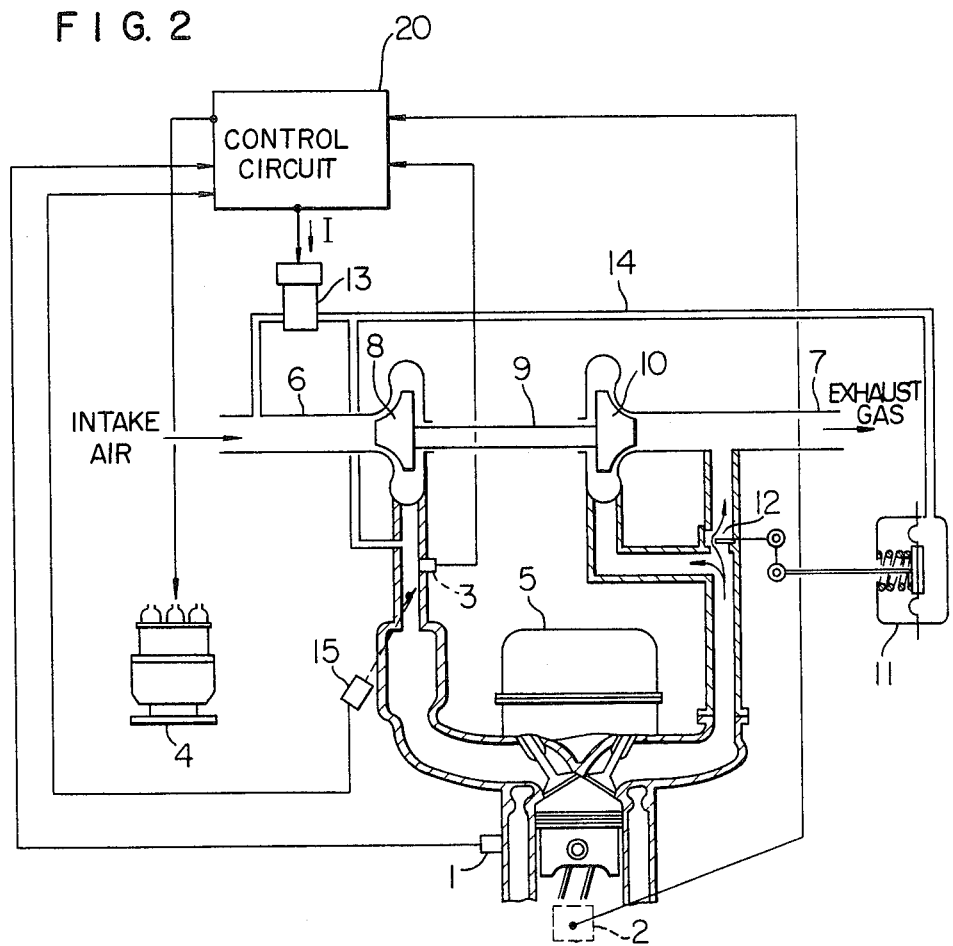
FIG. 2 is a block diagram showing a first embodiment of this invention.

FIG. 2 is a whole diagram of an engine showing a first embodiment of this invention. A reference numeral 1 denotes a knocking sensor; 2 a rotation sensor such as a crank angle sensor for detecting the speed of the engine; 3 an intake air pressure sensor for detecting the intake air pressure; 4 an ignition timing controller such as a distributor; 5 an engine body; 6 an intake pipe; 7 an exhaust pipe; 8 a compressor; 9 a turbocharger; 10 a turbine; 11 a waste gate valve actuator; 12 a waste gate valve; 13 a variable throttle valve; and 14 a pressure guide tube. 11 to 14 form a supercharge pressure controller. 15 is a throttle sensor for sensing the throttle opening-degree. 20 denotes a control circuit which receives the detected output signal of each sensor to determine the optimum ignition timing and the intake air pressure for controlling both the ignition timing controllor and the supercharge pressure controller. The distributor 4 and the variable throttle valve 13 are controlled by signals from the control circuit 20. The waste gate valve 12 is controlled by the variable throttle valve 13 through the pressure guide tube 14 and the waste gate valve actuator 11, whereby the supercharged pressure is controlled.

As shown in the figure, the flow-path area of the variable throttle valve 13 is continually varied by the driving current I from the control circuit 20. This throttle valve is connected to one end of a branch tube provided in an intermediate portion of the guide tube 14 which connects the exit of the compressor 8 and the diaphragm chamber of the waste gate valve actuator 11. If the supercharged pressure is to be decreased due to the occurrence of knocking, the driving current I from the control circuit 20 is reduced in order that the flow-path area of the throttle valve 13 is decreased. The diaphragm chamber of the waste gate valve actuator 11 has been subjected to a low pressure since a certain part of the pressure at the exit of the compressor 8 has been bled through the throttle valve 13. However, due to a decrease in the flow-path area of the throttle valve, the pressure to be bled is decreased. Hence, the pressure applied to the diaphragm chamber increases. This causes an increase in the opening-degree of the waste gate valve 12, whereby the flow rate of the exhausted gas to the turbine 10 decreases. The revolution number of the turbo-charger 9 also decreases. Therefore, the exit pressure of the compressor 8 or the supercharge pressure decreases. If the supercharged pressure is to be increased, an inverse process should be taken. Here, it should be so designed that the constants of the fluid circuit be selected in the following way. Namely, even if the revolution number of the turbo-charger 9 and the supercharged pressure are decreased, it should not happen that the diaphragm of the waste gate valve actuator 11 and the waste gate valve 12 are driven such that the flow rate of the exhausted gas to the turbo-charager 9 increases.

Figure 3A:
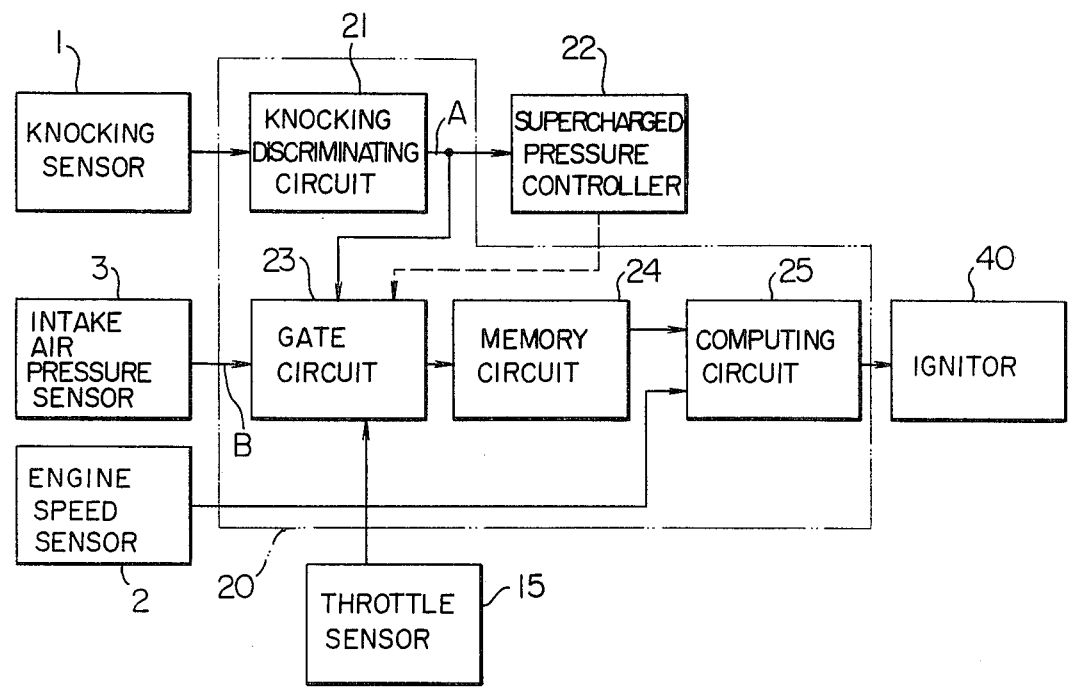
FIGS. 3(a) and 3(b) are block diagrams showing different examples of the control system of FIG. 2.
Figure 3B:
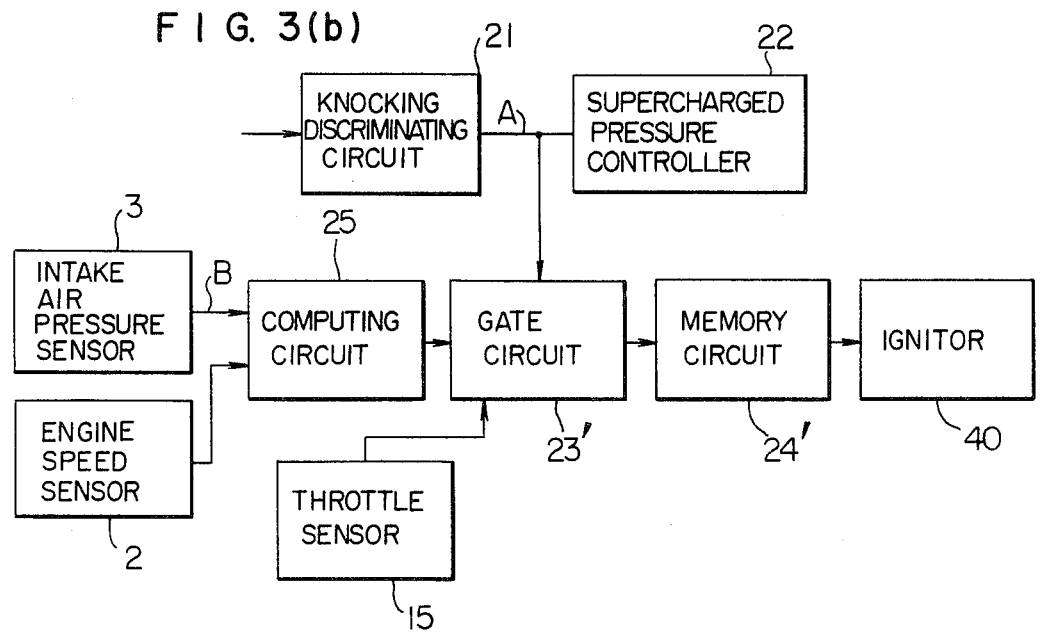

FIG. 3 (a) is a block diagram showing the detail of an example of the control system including the control circuit 20 of FIG. 2.

In FIG. 3 (a), a reference numeral 21 denotes a knocking discriminating circuit which discriminates the presence and the absence of knocking by a signal from the knocking sensor 1. The circuit responds to the occurrence of knocking and generates a knocking signal A. 22 is a supercharged pressure controller comprising e.g. a variable throttle valve 13 for controlling the decrease of the supercharged pressure by the knocking signal A. This controller may be formed by other mechanisms so long as the intake air pressure of the engine can be decreased by the knocking signal. 2 is an engine speed sensor such as a crank angle sensor which detects the revolution number of engine and generates an engine speed indicating signal. 3 is an intake air pressure sensor which detects the intake air pressure of the engine and generates an intake air pressure indicating signal B. 25 is a computing circuit which computes to determine the ignition timing from the engine speed indicating signal and the intake air pressure indicating signal. 40 is an ignitor which is constituted by a distributor, etc. Further, a gate circuit 23 and a memory circuit 24 are inserted between the intake air pressure sensor 3 and the ignition timing computing circuit 25. If the output value of the throttle-valve opening sensor 15 or the throttle opening-degree is constant, the gate circuit 23 inhibits the signal B from the intake air pressure sensor 3 to enter the ignition timing computing circuit 25 through the memory circuit 24 by means of both the knocking signal A generated from the knocking discriminating circuit 21 and the opening-degree signal from the throttle sensor 15. If the knocking disappears and the supercharged pressure is restored to a value at a time before the appearance of knocking, or if the output value of the throttle sensor 15 changes even if the knocking signal A is being generated, the gate curcuit 23 stops its interrupting operation and allows the intake air pressure signal B to enter the memory circuit 24. With the input of the intake air pressure signal B, the memory circuit 24 sends the signal to the ignition timing computing circuit 25. Without the input of the intake air pressure signal B, the memory circuit 24 stores and holds an intake air pressure signal at a time just before its disappearance, and sends it to the ignition timing computing circuit 25. In this way, in the absence of knocking, signals indicating the engine speed and the intake air pressure are introduced to the ignition timing computing circuit. If knocking occurs and the knocking discriminating circuit 21 generates the knocking signal A to both the supercharged pressure controller 22 and the gate circuit 23, the supercharged pressure is decreased due to the obviation of knocking if the opening-degree signal of the throttle sensor is constant. When the knocking discriminating circuit 21 detects any decrease in the output value of the intake air pressure sensor 3, the output of this intake air pressure sensor is inhibited by the knocking discriminating circuit 21. As a result, the engine speed indicating signal and the intake air pressure signal at the occurrence time of knocking which has been stored in the memory circuit 24 are introduced into the ignition timing computing circuit 25. Thus, when a knocking is caused, the operating state of the engine moves from the point C of knocking-limit to the point D in FIG. 1, since the ignition timing computing circuit 25 computes the ignition timing from the intake air pressure indicating signal held in response to the occurrence time of knocking. The ignition timing moves to the side of delay angle of the knocking-limit. Thus, the knocking is obviated. If the opening-degree signal of the throttle sensor 15 changes, the operating state of the engine 5 is modified. The gate circuit 23 stops its interrupting operation without regard to the presence and the absence of the knocking signal A. The ignition timing is computed from the engine speed and the intake air pressure in the new operating state. Even if further knocking should occur subsequently, it can be obviated by the above-mentioned operation. The supercharged pressure is decreased by the detection time of knocking. This reduction may be detected by the intake air pressure sensor 3. Alternatively, another sensor for detecting the supercharged pressure may be provided independently so that, after a reduction of supercharged pressure is definitely detected by the supercharged-pressure detecting sensor in the knocking detection period under the condition of a constant throttle opening-degree, the gate circuit 23 is operated (as denoted by a broken line connection) to introduce the stored data of the memory circuit 24 to the computing circuit 25.

Figure 4:
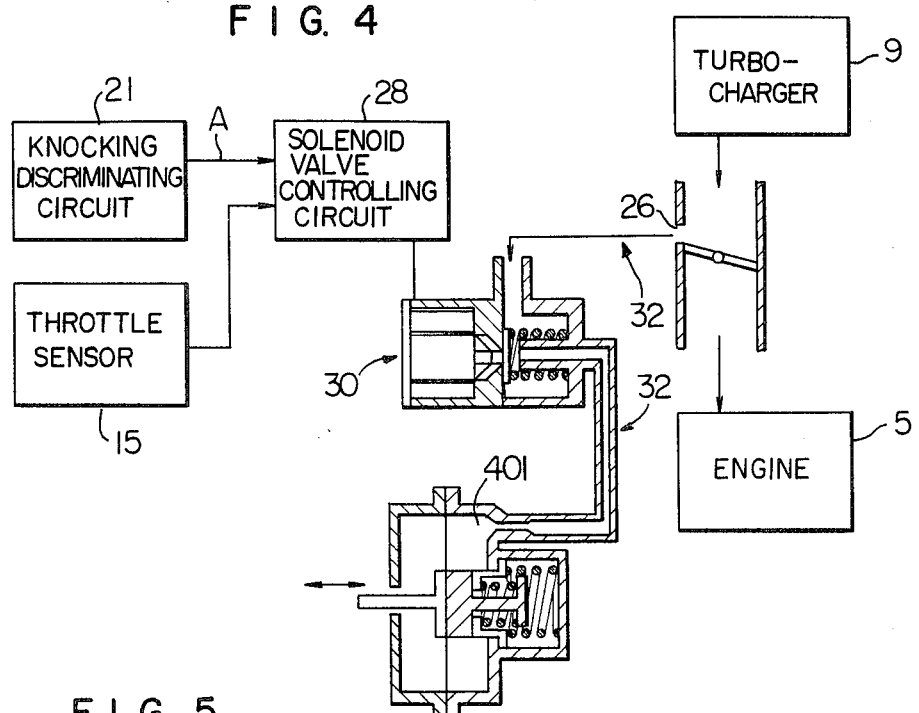
FIG. 4 is a block diagram showing an ignition timing control mechanism according to a second embodiment of this invention.

In comparison with the supercharged-pressure control mechanism of the first embodiment as shown in FIG. 2 and FIG. 3 (a), FIG. 4 shows a second embodiment in which in order to control the ignition timing the operation of a diaphragm of the distributor is controlled. In the case of a centrifugal type angle-advancing apparatus where the ignition timing controller causes an angle-advance with respect to the engine speed and a diaphragm type angle advance-delay apparatus where the ignition timing controller causes an angle-advance or an angle-delay with respect to the intake air pressure, an electromagnetic solenoid valve 30 is provided in an intermediate portion of a pipe 32 which connects a diaphragm chamber 401 and an advance port 26 of the engine. The electromagnetic solenoid valve 30 is controlled by a solenoid valve controlling circuit 28 which is similar to the gate circuit of FIG. 3. The electromagnetic solenoid valve 30 is opened or closed by a knocking signal A of the knocking discriminating circuit 21 and an opening-degree signal of the throttle sensor 15.

In the operation state without knocking, the electromagnetic solenoid valve 30 is in an open state. The pressure of the advance port 26 is applied directly to the diaphragm chamber 401 through the pipe 32. When knocking occurs and the knocking discriminating circuit 21 applies the knocking signal A to the solenoid valve controlling circuit 28, the circuit drives the electromagnetic solenoid valve 30 into a closed state if the opening-degree signal of the throttle sensor 15 is kept constant. Hence, the conduction between the diaphragm chamber 401 and the advance port 26 is cut off. Therefore, as in the case of the first embodiment, even if the supercharged pressure is decreased by a supercharged-pressure control for obviating knocking and the pressure applied to the advance port 26 is decreased, the pressure in the diaphragm 401 is kept at a value at the occurrence time of knocking. No angle advance occurs in the ignition timing in response to a fractional decrease of the intake air pressure. When the knocking disappears and the supercharged pressure is restored to a value at a time of the occurrence of knocking, the electromagnetic solenoid valve 30 is opened again. Even with the input of the knocking signal A to the solenoid control circuit 28, if the opening-degree signal of the throttle sensor 15 varies, the electromagnetic solenoid valve is brought to the open state. Then, the intake air pressure in a new operating state of the engine is applied to the diaphragm chamber 401. If further knocking should occur subsequently, the above-mentioned process is repeated.

Figure 5:
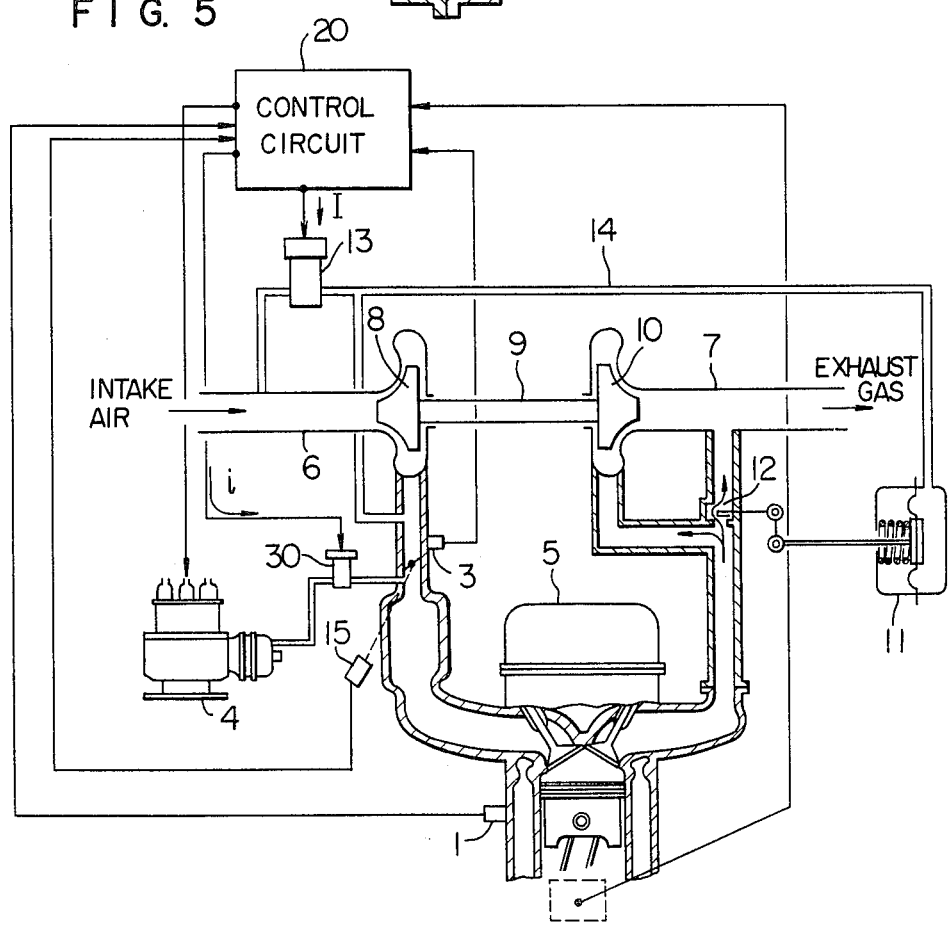
FIG. 5 shows a third embodiment of this invention.

FIG. 5 shows a third embodiment of this invention in which the supercharged-pressure control mechanism according to FIGS. 2 and 3 (a) and the ignition timing control mechanism of FIG. 4 are combined. In this case, the solenoid valve controlling circuit 28 of FIG. 4 is constituted by the gate circuit 23, the memory circuit 24 and the ignition timing operation circuit 25, etc.

Various alterations and modifications of the above-mentioned embodiments may be made. The arrangement of FIG. 3 (a) may be altered to that of FIG. 3 (b), where the gate circuit 23' and the memory circuit 24' are inserted between the ignition timing computing circuit 25 and the igniter 40. When the supercharged pressure is decreased to obviate knocking, even if the ignition timing is fixed to a value at the occurrence time of knocking, the operating state of the engine can be moved from the point C to the point D as shown in FIG. 1. The method of the invention may be also applied to a case where, besides the engine speed (revolution number) and the intake air pressure signals, an intake air temperature signal is additionally used.

As described above, according to this invention, in an internal combustion engine having an apparatus for obviating knocking by decreasing the supercharged pressure, it is discriminated whether a decrease of the supercharged pressure is due to the obviation of knocking or not. In the absence of knocking, the ignition timing is controlled by the engine speed and the intake air pressure, while in the presence of knocking the ignition timing is controlled not by the intake air pressure which has been decreased due to knocking but by the intake air pressure at the occurrence time of knocking.

The ignition timing of the ignition timing controller can be set at a knocking-limit at which the combustion rate and the output efficiency become optimum. Furthermore, the obviation of knocking by a reduction of the supercharged pressure is ensured. In this manner, the ignition timing is controlled at a value to keep the operating state of the engine optimum.

We claim:

1. An ignition timing control system for an internal combustion engine with a supercharger comprising:
   means for detecting the rotational engine speed of the engine and generating an engine speed signal;
   means for detecting the air pressure of the intake air flowing into said engine and generating an intake air pressure signal;
   means for detecting the opening degree of a throttle valve pivotally disposed in the intake pipe of said engine and generating a throttle valve opening signal;
   means for detecting knocking occurring in said engine and generating a knocking signal;
   means for controlling the ignition timing of said engine in response to said engine speed signal and said intake air pressure signal;
   means for decreasing the air pressure of the intake air between said supercharger and said engine when said knocking signal is generated; and
   means for stopping ignition timing controlling by said controlling means in response to said knocking signal and to said throttle valve opening signal indicating that the opening degree of said throttle valve is kept constant, to thereby hold the ignition timing at such a value as was controlled by said ignition timing controlling means before said knocking signal was generated.

2. An ignition timing control system according to claim 1, wherein said stopping means comprises:
   a gate circuit for receiving said intake air pressure signal, said throttle valve opening signal and said knocking signal and for passing said intake air pressure signal when said knocking signal is not generated, said gate circuit stopping passing of the intake air pressure signal when said knocking signal is generated and the opening degree of said throttle valve is kept constant; and a memory circuit connected between said gate circuit and said ignition timing control means for outputting the intake air pressure signal received from said gate circuit when said knocking signal is not generated, said memory circuit outputting the last received intake air pressure signal when said gate circuit stops passing of the intake air pressure signal.

3. An ignition timing control system according to claim 1, wherein said stopping means comprises:
   a gate circuit for receiving said knocking signal, said throttle opening signal and an ignition signal from said ignition timing control means for passing said ignition signal when said knocking signal is not generated, said gate circuit stopping passing of the ignition signal when said knocking signal is generated and the opening of said throttle valve is kept constant; and
   a memory circuit connected to said gate circuit for outputting the ignition signal received from said gate circuit when said knocking signal is not generated, said memory circuit outputting the last received ignition signal when said gate circuit stops passing of the ignition signal.

4. In an internal combustion engine having:
   a supercharger;

an ignition distributor with a vacuum chamber for controlling ignition timing in response to vacuum supplied to said vacuum chamber;

a tube connecting said vacuum chamber with an intake pipe of an engine; and valve means disposed in said tube for controlling communication between said vacuum chamber and said intake pipe, an ignition timing control system comprising:

means for detecting an opening degree of a throttle valve pivotally disposed in said intake pipe and generating a throttle valve opening signal;

means for detecting knocking occurring in said engine and generating a knocking signal;

means for decreasing the air pressure of the intake air between said supercharger and said engine when said knocking signal is generated; and control means connected to said throttle valve opening degree detecting means and said knocking detecting means for generating a control signal when said knocking signal is generated and the opening degree of said throttle valve is kept constant, said control signal being applied to said valve means to interrupt the communication between said vacuum chamber and said intake pipe.

* * * * *